United States Patent
Ito et al.

(10) Patent No.: US 9,058,254 B2
(45) Date of Patent: Jun. 16, 2015

(54) MEMORY DEVICE

(75) Inventors: Takafumi Ito, Ome (JP); Hidetaka Tsuji, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 284 days.

(21) Appl. No.: 13/367,779

(22) Filed: Feb. 7, 2012

(65) Prior Publication Data

US 2012/0137057 A1  May 31, 2012

Related U.S. Application Data

(63) Continuation of application No. 11/955,926, filed on Dec. 13, 2007, now Pat. No. 8,145,827.

(30) Foreign Application Priority Data

Dec. 15, 2006 (JP) .................. 2006-338718

(51) Int. Cl.
| | |
|---|---|
| G06F 12/00 | (2006.01) |
| G06F 13/00 | (2006.01) |
| G06F 13/28 | (2006.01) |
| G06F 12/02 | (2006.01) |

(52) U.S. Cl.
CPC .... *G06F 12/0246* (2013.01); *G06F 2212/7203* (2013.01)

(58) Field of Classification Search
CPC ................ G06F 12/0246; G06F 2212/7203
USPC ........................... 711/103, E12.008
See application file for complete search history.

(56) References Cited

U.S. PATENT DOCUMENTS

| | | | |
|---|---|---|---|
| 6,028,807 A * | 2/2000 | Awsienko | 365/230.02 |
| 6,452,693 B1 * | 9/2002 | Isoda et al. | 358/1.16 |
| 6,763,424 B2 * | 7/2004 | Conley | 711/103 |
| 7,278,001 B2 | 10/2007 | Oshima | |
| 7,814,264 B2 | 10/2010 | Oshima | |
| 2003/0110343 A1 * | 6/2003 | Hagiwara et al. | 711/5 |
| 2004/0210708 A1 * | 10/2004 | Conley | 711/103 |
| 2005/0055497 A1 | 3/2005 | Estakhri et al. | |
| 2005/0066112 A1 * | 3/2005 | Osakabe et al. | 711/103 |
| 2005/0204187 A1 | 9/2005 | Lee et al. | |
| 2005/0268026 A1 * | 12/2005 | Oshima | 711/103 |
| 2006/0064538 A1 * | 3/2006 | Aizawa | 711/103 |
| 2006/0155922 A1 * | 7/2006 | Gorobets et al. | 711/103 |
| 2006/0161722 A1 * | 7/2006 | Bennett et al. | 711/103 |
| 2006/0179263 A1 * | 8/2006 | Song et al. | 711/170 |
| 2007/0033364 A1 * | 2/2007 | Maeda et al. | 711/170 |
| 2007/0061506 A1 * | 3/2007 | Liang et al. | 711/103 |
| 2007/0078951 A1 * | 4/2007 | Murai et al. | 709/217 |
| 2008/0082775 A1 * | 4/2008 | Gorobets | 711/170 |
| 2008/0091901 A1 | 4/2008 | Bennett et al. | |
| 2010/0235564 A1 | 9/2010 | Ito | |

FOREIGN PATENT DOCUMENTS

| | | |
|---|---|---|
| JP | 2007-517319 | 6/2007 |
| WO | WO 2005/066790 A1 | 7/2005 |

* cited by examiner

*Primary Examiner* — Sheng-Jen Tsai
(74) *Attorney, Agent, or Firm* — Oblon, McClelland, Maier & Neustadt, L.L.P.

(57) ABSTRACT

A memory device includes a nonvolatile memory and a controller. The nonvolatile memory includes a storage area having a plurality of memory blocks each including a plurality of nonvolatile memory cells, and a buffer including a plurality of nonvolatile memory cells and configured to temporarily store data, and in which data is erased for each block. If a size of write data related to one write command is not more than a predetermined size, the controller writes the write data to the buffer.

8 Claims, 10 Drawing Sheets

| Step | Data written to random write buffer 32 ||||||||| The number of valid data |
|------|---------|---------|---------|---------|---------|---------|---------|---------|---|
|      | Block A | Block B | Block C | Block D | Block E | Block F | Block G | Block H |   |
| (1)  | 1       |         |         |         |         |         |         |         | 1 |
| (2)  | 1       | 2       |         |         |         |         |         |         | 2 |
| (3)  | 1       | 2       | 3       |         |         |         |         |         | 3 |
| (4)  | 1       | 2       | 3       | 4       |         |         |         |         | 4 |
| (5)  | 1       | 2       | 3       | 4       | 5       |         |         |         | 5 |
| (6)  | 1       | 2       | 3       | 4       | 5       | 6       |         |         | 6 |
| (7)  | 1       | 2       | 3       | 4       | 5       | 6       | 7       |         | 7 |
| (8)  | 1       | 2       | 3       | 4       | 5       | 6       | 7       | 8       | 8 |
| (9)  | 1,9     | 2       | 3       | 4       | 5       | 6       | 7       | 8       | 9 |
| (10) | 1,9     | 2,10    | 3       | 4       | 5       | 6       | 7       | 8       | 10 |
| (11) | 1,9     | 2,10    | 3,11    | 4       | 5       | 6       | 7       | 8       | 11 |
| (12) | 1,9     | 2,10    | 3,11    | 4,12    | 5       | 6       | 7       | 8       | 12 |
| (13) | -1,-9   | 2,10    | 3,11    | 4,12    | 5       | 6       | 7       | 8       | 11 |
| (14) | -1,-9   | 2,10    | 3,11    | 4,12    | 5,13    | 6       | 7       | 8       | 12 |
| (15) | -1,-9   | -2,-10  | 3,11    | 4,12    | 5,13    | 6       | 7       | 8       | 11 |
| (16) | -1,-9   | -2,-10  | 3,11    | 4,12    | 5,13    | 6,14    | 7       | 8       | 12 |
| (17) | -1,-9   | -2,-10  | -3,-11  | 4,12    | 5,13    | 6,14    | 7,15    | 8       | 11 |
| (18) | -1,-9   | -2,-10  | -3,-11  | 4,12    | 5,13    | 6,14    | 7,15,16 | 8       | 12 |
| (19) | -1,-9   | -2,-10  | -3,-11  | 4,12    | 5,13    | 6,14    | 7,15,16,17 | 8    | 11 |
| (20) | -1,-9   | -2,-10  | -3,-11  | 4,12    | 5,13    | 6,14    | 7,15,16,17,18 | 8 | 12 |
| (21) | -1,-9   | -2,-10  | -3,-11  | 4,12    | 5,13    | 6,14    | -7,-15,-16,-17,-18,19 | 8 | 8 |

MEMORY DEVICE

CROSS-REFERENCE TO RELATED APPLICATIONS

This application is a continuation of and claims the benefit of priority under 35 U.S.C. §120 from U.S. Ser. No. 11/955,926, filed Dec. 13, 2007, and claims the benefit of priority from prior Japanese Patent Application No. 2006-338718, filed Dec. 15, 2006, the entire contents of which are incorporated herein by reference.

BACKGROUND OF THE INVENTION

1. Field of the Invention

The present invention relates to a memory device that performs data transfer with a host apparatus and, more particularly, to a memory device including a nonvolatile semiconductor memory.

2. Description of the Related Art

Presently, memory cards including nonvolatile semiconductor memories are used as memory devices for recording music data, video data, and the like. In the nonvolatile semiconductor memories, data does not disappear even when the power supply is turned off, and can also be rewritten (updated). A NAND flash memory and the like are used as the nonvolatile semiconductor memories.

In the NAND flash memory, data is written for each page (e.g., 2, 4, or 8 Kbytes), and erased for each block (e.g., 512 Kbytes or 1 Mbytes) composed of a plurality of pages. Also, data write to the NAND flash memory has the following limitations.

(1) Data must be erased for each block beforehand.

(2) When writing data in the same block, data to be written next to preceding data must be written at an address larger than that of the preceding data.

For example, when writing new data in a block in which data is already written, an erased block is separately prepared, and the new data is written in this erased block. In addition, data is copied from the original block to a portion except for the portion where the new data is written. That is, data write like this is implemented by a so-called "moving" process. Especially when data write occurs from a host apparatus at random logical addresses, this moving process frequently occurs to deteriorate the write performance.

In the recent NAND flash memories, the block size is increasing as the capacity increases. As the block size increases, the inter-block data copying time prolongs, and a maximum value of the moving time increases. This prolongs the write time (also called the busy time) in a memory card with respect to data write at random logical addresses.

On the other hand, if a data write process specialized to shorten the time of data write at random logical addresses is used in order to shorten the busy time, the speed of data write at sequential logical addresses decreases.

As a related technique of this kind, a technique that presumes the performance of a memory device is disclosed (Jpn. Pat. Appln. KOKAI Publication No. 2006-178923).

BRIEF SUMMARY OF THE INVENTION

According to a first aspect of the present invention, there is provided a memory device comprising:

a nonvolatile memory which includes a storage area having a plurality of memory blocks each including a plurality of nonvolatile memory cells, and a buffer including a plurality of nonvolatile memory cells and configured to temporarily store data, and in which data is erased for each block; and a controller which, if a size of write data related to one write command is not more than a predetermined size, writes the write data to the buffer.

According to a second aspect of the present invention, there is provided a memory device comprising:

a nonvolatile memory which includes a plurality of memory blocks each having a plurality of nonvolatile memory cells, and in which data is erased for each block; and a controller which manages each memory block by dividing the memory block into two block portions, and, when receiving a write request for a certain address in a first memory block, writes, regardless of the address, write data related to the write request to a start position of a block portion corresponding the address in a second memory block from which data has been erased.

DETAILED DESCRIPTION OF THE INVENTION

An embodiment of the present invention will be explained below with reference to the accompanying drawing. Note that in the following explanation, the same reference numerals denote elements having the same functions and arrangements, and a repetitive explanation will be made only when necessary.

[1] Arrangement of Memory Device and Host Apparatus

In this embodiment, a memory device will be explained by taking a memory card as an example. The memory card is designed to be detachable from a host apparatus. However, it is also possible to configure the memory device and host apparatus as one LSI (Large-Scale Integrated Circuit). That is, a controller and nonvolatile semiconductor memory forming the storage device may also be mounted on a printed circuit board on which the host apparatus is mounted.

Figure 1:
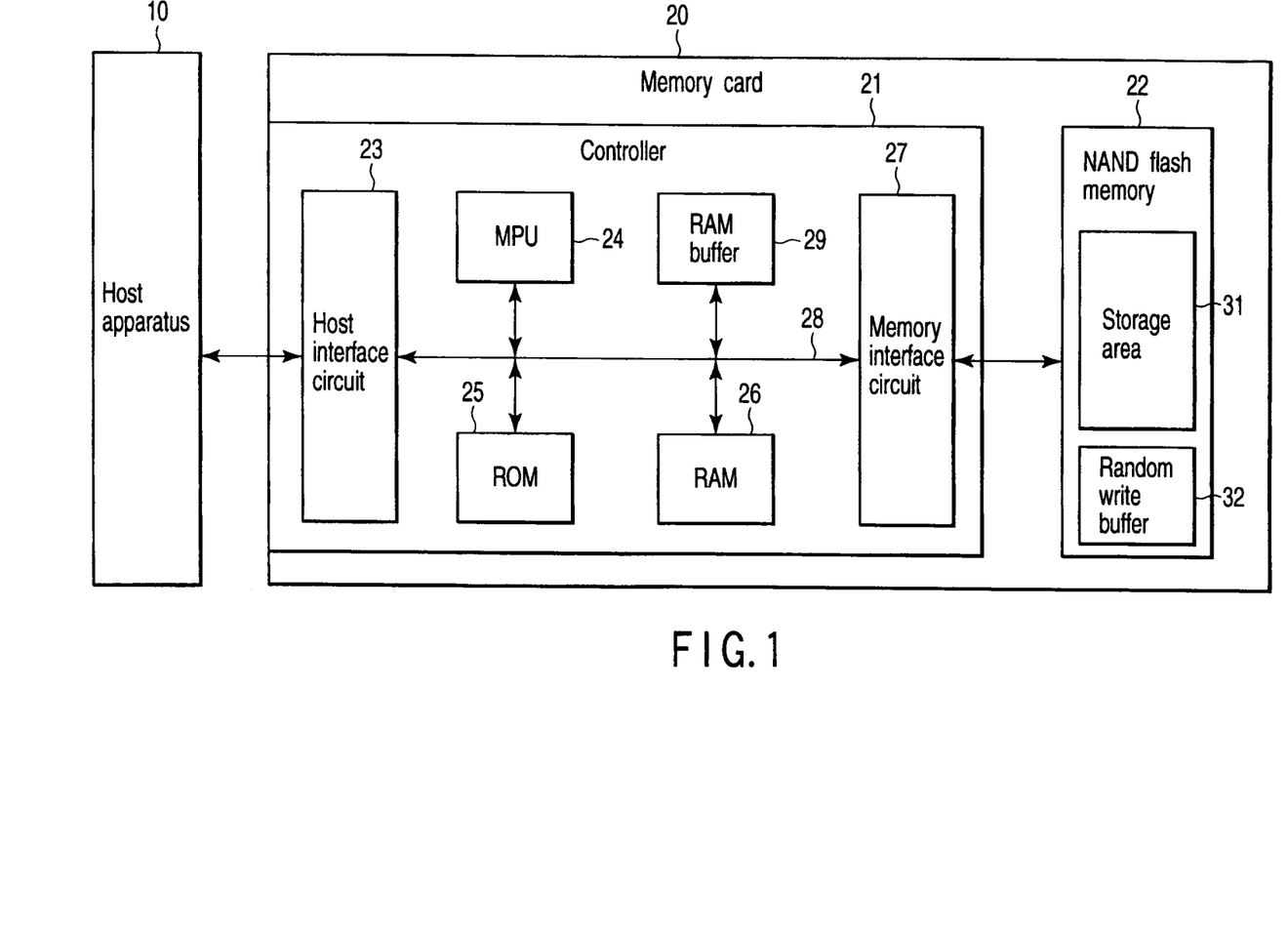
FIG. 1 is a block diagram illustrating the arrangement of a host apparatus 10 and memory card 20 according to an embodiment of the present invention.

FIG. 1 is a block diagram illustrating the arrangement of a host apparatus 10 and memory card 20 according to an embodiment of the present invention. The memory card 20 is designed to be detachable from the host apparatus 10. The memory card 20 is generally attached to the host apparatus 10 and used as a kind of an external storage medium of the host apparatus 10.

The memory card 20 includes a nonvolatile semiconductor memory 22. In this embodiment, the nonvolatile semiconductor memory 22 will be explained by taking, as an example, a NAND flash memory 22 as a kind of an EEPROM (Electrically Erasable Programmable Read Only Memory) that electrically writes and erases data. Note that the arrangement shown in FIG. 1 includes one NAND flash memory 22, but two or more NAND flash memories 22 may also be used.

Flash memory cells (memory cell transistors) forming the NAND flash memory 22 each have a stacked gate structure formed by stacking a floating gate electrode for storing electric charge, an inter-gate insulating film, and a control gate electrode on a tunnel insulating film on a semiconductor substrate. A plurality of memory cell transistors are connected in series in the column direction such that adjacent transistors share a diffusion region (source/drain region), and selection gate transistors are arranged at the two ends of this series circuit, thereby forming a NAND cell unit.

A block is formed by arranging a plurality of units in the row direction (the direction in which word lines WL run). This block is a data erase unit. A plurality of memory cells connected to the same word line WL in one block are processed as a page, and data write and read are performed for each page.

The NAND flash memory 22 comprises a plurality of blocks, and each block includes a plurality of pages. The NAND flash memory 22 also comprises a storage area 31 and random write buffer 32. The storage area 31 stores write data transferred from the host apparatus 10 on the basis of a logical address. The storage area 31 is also a user data area which the user using the memory card 20 can freely access. This user data area stores user data and the like.

The random write buffer 32 temporarily stores predetermined write data (to be described later) among the write data transferred from the host apparatus 10. Similar to the storage area 31, the random write buffer 32 is a NAND flash memory and comprises a plurality of blocks. Each block of the random write buffer 32 is composed of a plurality of pages as data write units.

The memory card 20 has a controller 21 that is formed between the host apparatus 10 and NAND flash memory 22, and controls the NAND flash memory 22 on the basis of instructions from the host apparatus 10. The controller 21 comprises a host interface circuit 23, MPU (Micro Processing Unit) 24, ROM (Read Only Memory) 25, RAM (Random Access Memory) 26, memory interface circuit 27, bus 28, and RAM buffer 29.

The host interface circuit 23 is connected to the host apparatus 10 via a connector (not shown). The host interface circuit 32 is a functional block that exchanges commands, various data, and the like with the host apparatus 10 in accordance with a predetermined protocol under the control of the MPU 24.

The MPU 24 comprehensively controls the overall operation of the memory card 20 via the bus 28. When power is supplied to the memory card 20, for example, the MPU 24 executes basic control of the memory card 20 on the basis of firmware stored in the ROM 25 or the like. The MPU 24 also receives a write command, read command, erase command, or the like from the host apparatus 10, and transfers data to the NAND flash memory 22.

The memory interface circuit 27 is connected to the NAND flash memory 22 via a bus, and executes a series of memory access control operations necessary to access the NAND flash memory 22. More specifically, the memory interface circuit 27 executes a write operation, read operation, erase operation, or the like to the NAND flash memory 22 under the control of the MPU 24.

The ROM 25 stores firmware, control programs, and the like. The firmware is a program for performing the basic control of the memory card 20. The control programs include a program which the MPU 24 uses when the controller 21 performs data transfer with the host apparatus 10. The control programs also include a program which the MPU 24 uses when the controller 21 performs data transfer with the NAND flash memory 22. The RAM 26 is used as a work area of the MPU 24, and stores various tables.

The RAM buffer 29 temporarily stores data transmitted from the host apparatus 10, and data read from the NAND flash memory 22. That is, data read from the NAND flash memory 22 is temporarily stored in the RAM buffer 29 until the host apparatus 10 becomes ready to receive the data. Also, data transmitted from the host apparatus 10 is temporarily stored in the RAM buffer 29 until the NAND flash memory 22 becomes ready to write the data.

The host apparatus 10 comprises hardware and software (a system) for accessing the memory card 20 attached to the host apparatus 10. Examples of the host apparatus 10 are information processing apparatuses such as a personal computer, digital camera, and cell phone terminal that process various data such as image data, music data, and ID data.

[2] Standards Applied to Memory Card 20

The memory card 20 of this embodiment executes a data transfer operation so as to satisfy the standards concerning timeout, and the standards concerning a speed class. The standards concerning timeout and the standards concerning a speed class will be explained below. Note that in this embodiment, these standards will be explained by taking an SD™ memory card as an example.

[2-1] Standards Concerning Timeout

The SD™ memory card standards perform data block transfer for every 512 bytes (B). The memory card 20 must write a data block within a predetermined time (timeout period). More specifically, the SD™ memory card standards define a busy time for each 512-B data block transfer time. When a data block is transmitted from the host apparatus 10 to the memory card 20, this busy time is required for the memory card 20 to receive the data block.

Also, a maximum busy time is defined as 250 ms. Under any circumstances, therefore, the memory card 20 must complete the process of receiving a 512-B data block transferred from the host apparatus 10 within the maximum busy time.

Note that in the following explanation, "a data block" means a mass of data to be transferred, and "a block" means a memory block as the erase unit of the NAND flash memory.

[2-2] Standards Concerning Speed Class

The SD™ memory card standards define a speed class representing the performance of a memory card. This speed class guarantees that data can be written at a predetermined rate within a predetermined logical address range (e.g., for each 4-MB address boundary). This predetermined logical address range is called an AU (Allocation Unit) in the SD™ memory card standards. Also, the speed class is defined as performance when data is written by multi-block write for every 16 KB.

For example, the AU is determined to be 4 MB (a maximum value) for a memory card having a capacity of 1 GB or more. It is necessary to guarantee that the write speed (minimum guaranteed speed) is 6 MB/s or more for class 6, 4 MB/s or more for class 4, and 2 MB/s or more for class 2.

[3] Data Write Operation

Next, the operation of writing data in the memory card 20 from the host apparatus 10 will be explained. This data write operation is classified into single-block write and multi-block write. Also, data write is performed for each data block as a mass of data having a predetermined size (e.g., 512 B). Single-block write is a method by which only one data block is transferred following one write command from the host apparatus 10 and written. Multi-block write is a method by which a plurality of consecutive data blocks are transferred following one write command from the host apparatus 10 and written.

The host apparatus 10 performs random write for each 512-B data block. In this random write, an "update" process (overwrite process) that rewrites data in only a part of a block frequently occurs. In the NAND flash memory 22, data can be erased for only each block.

When rewriting only a part of a block, therefore, it is necessary to prepare an erased block, write new data for rewrite in this erased block, and copy the remaining data not to be rewritten to the erase block from the old block including old data to be rewritten with the new data. Accordingly, the process of rewriting only a part of a block includes the process of moving data not to be rewritten. If the process of rewriting only a part of a block frequently occurs, therefore, the overhead extremely increases.

This embodiment reduces the time required for data rewrite by reducing the data moving process. That is, when data rewrite occurs, new data to be written is written in an erased physical block regardless of the logical addresses. In addition, this new data to be written is sequentially written from the first page of the erased physical block (to be referred to as a page shift method hereinafter).

Figure 2:
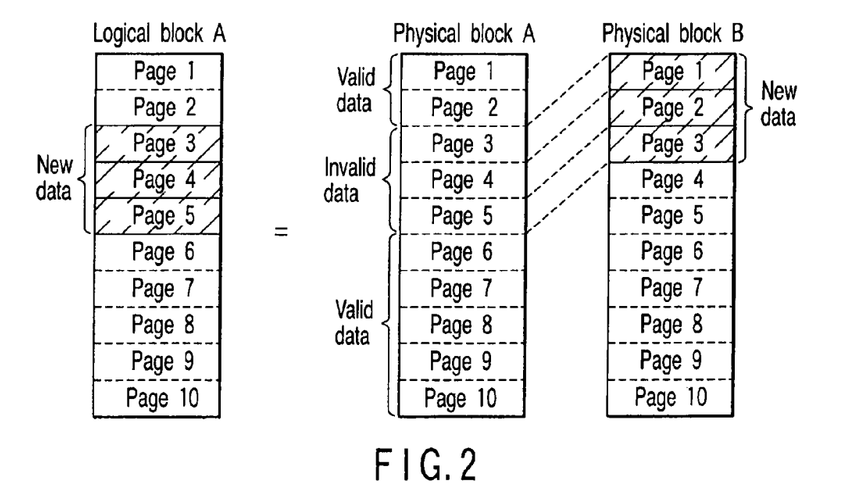
FIG. 2 is a schematic view illustrating a data rewrite operation in a page shift method.

FIG. 2 is a schematic view illustrating the data rewrite operation in the page shift method. For the sake of simplicity, FIG. 2 shows an example in which one block is composed of 10 pages. Arbitrary data is prewritten in pages 1 to 10 of logical block A. For example, the same data as in logical block A is written in pages 1 to 10 of physical block A. Physical block B is an erased block.

The host apparatus 10 issues a write command to overwrite new data in pages 3 to 5 of logical block A of the memory card 20. The controller 21 does not write this new data in pages corresponding to the logical addresses of new erased physical block B, but sequentially writes the new data from the first page (page 1) of physical block B. At the same time, the controller 21 writes the addresses of the pages (pages 3 to 5 of physical block A) as objects of the write request in redundancy areas of the pages in which the new data is written. In this state, the new data overwrite process is complete.

The above processing obviates the data moving process when overwriting data in logical block A. This makes it possible to perform a rewrite operation to logical block A at a high speed. When reading data, the controller 21 can obtain positions (physical pages) where the data to be read is stored by referring to addresses stored in redundancy areas of the pages.

In the rewrite operation as described above, a plurality of data stored in pages 1 to 10 of logical block A are separately stored in physical blocks A and B. If this condition is left unchanged, the speed of a data read operation or the usage of the NAND flash memory 22 decreases.

Figure 3:
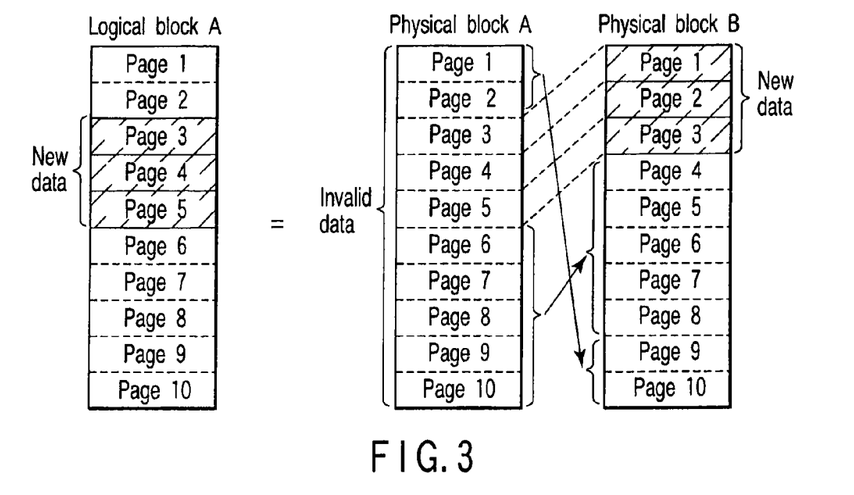
FIG. 3 is a schematic view illustrating the process of coupling data separately stored in two areas, i.e., physical blocks A and B.

Accordingly, this embodiment performs the process (to be referred to as the DS coupling process hereinafter) of coupling data separately stored in two areas (DS; Dual Sector), i.e., physical blocks A and B, in parallel with the data block write process.

FIG. 3 is a schematic view illustrating the process of coupling data separately stored in two areas, i.e., physical blocks A and B. The controller 21 executes the process of moving the data stored in pages (pages 6 to 10) below the pages corresponding to the new data in physical block A. That is, the controller 21 writes the data of pages 6 to 10 of physical block A in pages 4 to 8, respectively, of physical block B.

Subsequently, the controller 21 executes the process of moving the data stored in pages (pages 1 and 2) above the pages corresponding to the new data in physical block A. That is, the controller 21 writes the data of pages 1 and 2 of physical block A in pages 9 and 10, respectively, of physical block B.

When the DS coupling process as described above is performed, the data separately stored in physical blocks A and B can be collectively stored in physical block B. Since this invalidates all the data stored in physical block A, the new data can be written by erasing the data of physical block A. Consequently, the usage of the NAND flash memory 22 increases.

The controller 21 performs this DS coupling process in parallel with the data write operation. However, the DS coupling process is maximally equivalent to a data copying process of about one block. The time required for this data copying process changes in accordance with the block size. If the one-block data copying process takes a long time, therefore, a maximum busy time is exceeded, so the timeout specification cannot be met any longer.

A write operation meeting the timeout specification will be explained below for each of single-block write and multi-block write.

[3-1] Control of Single-Block Write

In single-block write, the host apparatus 10 performs random write for each 512-B data block. In this random write, the process of rewriting (overwriting) data of only a part of a block frequently occurs. In this case, the DS coupling process is necessary if write data is written in an erased physical block.

In this embodiment, when the DS coupling process is necessary, the controller 21 does not directly write a data block transmitted from the host apparatus 10 in the storage area 31 of the NAND flash memory 22, but temporarily adds the data block to the random write buffer 32. This reduces the number of copying processes (moving processes) that occur whenever the DS coupling process is required. The random write buffer 32 is a buffer in which the controller 21 secures a predetermined number of memory blocks in the NAND flash memory 22 separately from memory blocks used for normal data storage.

Figure 4:
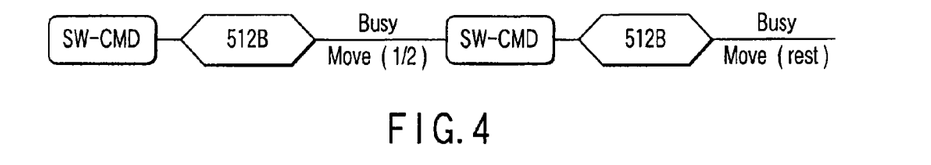
FIG. 4 is a timing chart illustrating a single-block write operation.

FIG. 4 is a timing chart illustrating the single-block write operation. Note that FIG. 4 shows data on the bus connecting the host apparatus 10 and controller 21.

First, the controller 21 receives a single-block write command (SW-CMD) issued from the host apparatus 10, and interprets the command. Subsequently, the host apparatus 10 transmits a 512-B data block (write data) to the controller 21.

The controller 21 transmits a busy signal to the host apparatus 10. Then, the controller 21 executes the process of receiving the data block transmitted from the host apparatus 10 (more specifically, the process of temporarily writing the data block in the RAM buffer 29), within the range of a maximum busy time. When completing this receiving process, the controller 21 cancels the busy state. After that, the controller 21 adds this data block to the random write buffer 32.

Similarly, the controller 21 executes the data block receiving process for the next SW-CMD, and adds this data block to the random write buffer 32. This processing can reduce the data moving process having occurred in order to rewrite one data block.

The size of the random write buffer 32 is finite, however, and it is necessary to minimize the size of the random write buffer 32 in order to effectively use the capacity of the NAND flash memory 22. Therefore, data written in the random write buffer 32 must be written back in physical blocks in the storage area 31 by an appropriate method. This process will be called "rearrangement" in this embodiment. This rearrangement is the process of coupling data in a certain physical block of the storage area 31 with that data in the random write buffer 32 which corresponds to the physical block, and copying the coupled data to another physical block containing no valid data.

If the number of free entries in the random write buffer 32 is, e.g., two or less, or if a maximum number of data per block in the random write buffer 32 is equal to or larger than a predetermined number (one or more), the controller 21 preferentially rearranges a block containing the largest amount of write data stored in the random write buffer 32, and copies the write data in the random write buffer 32 to the storage area 31.

A large amount of write data can be processed at once when a block is rearranged after a maximum amount of write data is stored in the random write buffer 32. This makes it possible to efficiently increase the free area in the random write buffer 32, and decrease the size of the random write buffer 32. During this rearrangement, the process (data copying process) of moving one block is separately performed for, e.g., the two halves of the block in the busy periods of two single-block write operations, thereby preventing timeout even if the data copying time of one block is long.

Figure 5:
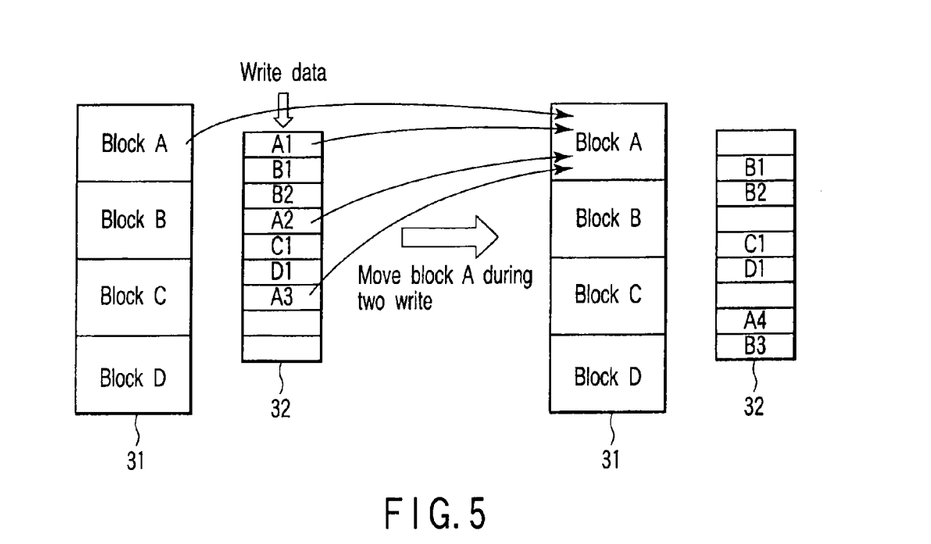
FIG. 5 is a schematic view illustrating the single-block write operation.

FIG. 5 is a schematic view illustrating the single-block write operation. Assume that the storage area 31 is composed of four blocks A to D for the sake of descriptive simplicity. In the single-block write operation, 512-B write data is sequentially added to the random write buffer 32 whenever the DS coupling process is required.

As shown in FIG. 5, seven write data (A1 to A3, B1, B2, C1, and D1) are stored in the random write buffer 32. Write data A1 to A3 are write data (data to be written in block A) corresponding to logical addresses in block A. Likewise, write data B1 and B2 are write data corresponding to logical addresses in block B, write data C1 is write data corresponding to physical addresses in block C, and write data D1 is write data corresponding to physical addresses in block D.

Assume that when the number of free entries in the random write buffer 32 is, e.g., two or less, block A in which the number of data in the random write buffer 32 per block is largest is an object of rearrangement. Therefore, write data A1 to A3 are copied to block A, and the process of moving block A (the process of moving data not to be rewritten) is performed.

In addition, the block A moving process is performed during the busy periods of two data block receiving processes. That is, a half of the block A moving process is performed in the first busy period shown in FIG. 4, and the rest of the block A moving process is performed in the second busy period shown in FIG. 4.

By performing the processing as described above in the overwrite operation of single-block write, the moving process accompanying one write process can be reduced. This makes it possible to perform the single-block write operation at a high speed. It is also possible to prevent timeout caused by the block moving process by separately performing the moving process in two data block write processes.

Note that in the above explanation of single-block write, data is written in the random write buffer 32 when the DS coupling process is necessary. However, data may also be written in the random write buffer 32 when no data rewrite is necessary or data rewrite is not accompanied by data copying.

[3-1-1] Number of Entries Necessary for Random Write Buffer 32

The size of the random write buffer 32 will now be explained. The number of entries of the random write buffer 32 is set such that data does not overflow from the random write buffer 32 regardless of logical addresses where data write occurs in single-block write. Note that the number of entries is the number of valid data blocks that can be buffered in the random write buffer 32. Note also that the number of entries corresponds to the number of pages in the random write buffer 32 because the random write buffer 32 is a NAND flash memory.

This embodiment separately performs the moving process (including the rearrangement of the random write buffer 32) in two data write processes. These two data write processes add two write data to the random write buffer 32. Therefore, no write data overflows from the random write buffer 32 if two buffering data in the random write buffer 32 are rearranged (i.e., copied to a block in the storage area 31) in the two data write processes during the moving process.

Let N be the number of blocks in the storage area 31, and M be the number of valid data that can be buffered in the random write buffer 32. Each of N and M is an integer of one or more.

Assuming that "M=N+4", when the random write buffer 32 is filled with (N+2) blocks, at least one block containing two or more buffering data related to the same block always exists. By setting this block as an object to be moved, therefore, one block can be rearranged while new write data is buffered in the random write buffer 32. In this case, the two or more buffering data related to this block are rearranged from the random write buffer 32.

Accordingly, when at least M entries meeting the above conditions are prepared in the random write buffer 32, the free space in the random write buffer 32 does not reduce, and no write data overflows from the random write buffer 32.

Figure 6:
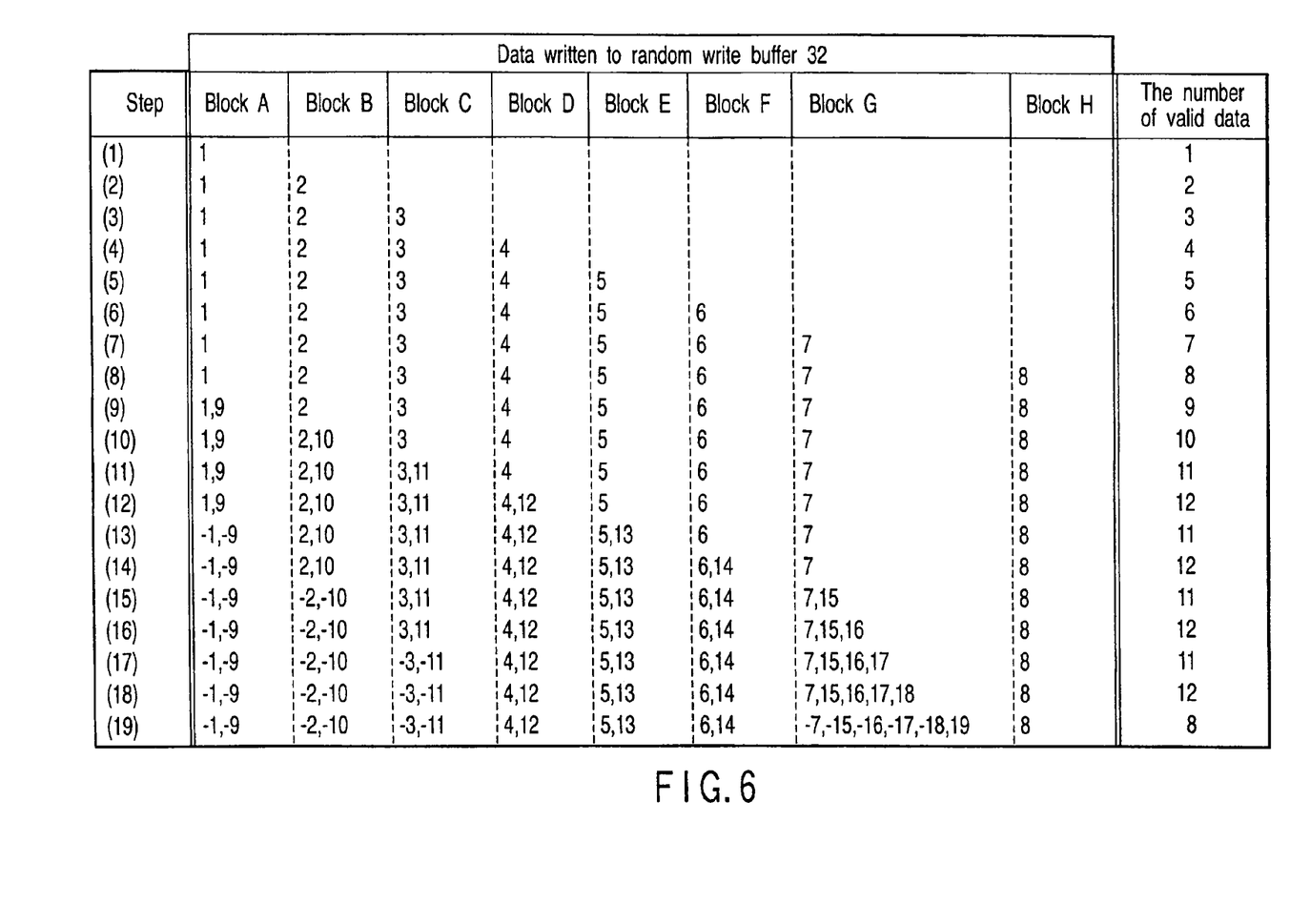
FIG. 6 is a view illustrating the relationship between data written to a random write buffer 32 and the number of valid data that can be buffered in the random write buffer 32.

The number of valid data that can be buffered in the random write buffer 32 will be explained below in association with a practical data write operation. FIG. 6 is a view illustrating the relationship between data written to the random write buffer 32 and the number of valid data that can be buffered in the random write buffer 32. Note that the memory card 20 has eight logical blocks A to H. Note also that in order to indicate the relationships between the data written in the random write buffer 32 and the logical blocks, FIG. 6 shows the write data for each of logical blocks A to H.

In step (1), the host apparatus 10 writes data "1" in logical block A. In response to this write operation, the controller 21 writes data "1" in the random write buffer 32. In this state, the number of valid data in the random write buffer 32 is "1". Then, in step (2), the host apparatus 10 writes data "2" in logical block B. In response to this write operation, the controller 21 writes data "2" in the random write buffer 32. In this state, the number of valid data in the random write buffer 32 is "2".

Similarly, in steps (3) to (11), the host apparatus 10 sequentially writes data "3" to "11" in the logical blocks shown in FIG. 6. In response to these write operations, the controller 21 sequentially writes data "3" to "11" in the random write buffer 32. In step (11), the number of valid data in the random write buffer 32 is "11".

Subsequently, in step (12), the host apparatus 10 writes data "12" in logical block D. In response to this write operation, the controller 21 performs the process of moving a half of block A. The controller 21 also writes data "12" in the random write buffer 32. In this state, the number of valid data in the random write buffer 32 is "12".

In step (13), the host apparatus 10 writes data "13" in logical block E. In response to this write operation, the controller 21 performs the process of moving the remaining half of block A. Consequently, data "1" and "9" associated with logical block A are copied to the storage area 31, so data "1" and "9" in the random write buffer 32 are invalid data. Referring to FIG. 6, the "-" sign is attached to invalid data. Also, the controller 21 writes data "13" in the random write buffer 32. In this state, the number of valid data in the random write buffer 32 is "11".

Analogously, in steps (14) to (19), data "14" to "19" are sequentially written in the random write buffer 32. In steps (14) and (15), the controller 21 performs the process of moving block B. In steps (16) and (17), the controller 21 performs the process of moving block C. In steps (18) and (19), the controller 21 performs the process of moving block G.

In these processes, as shown in FIG. 6, the upper limit of the number of valid data in the random write buffer 32 is "12", so the number of entries necessary for the random write buffer 32 is "12". That is, no write data overflows from the random write buffer 32 when the above-mentioned relation between the number N of blocks in the storage area 31 and the number M of valid data that can be buffered in the random write buffer 32 is met.

[3-1-2] Garbage Collection of Random Write Buffer 32

Since the random write buffer 32 is a NAND flash memory, no data can be written in any arbitrary physical address of the random write buffer 32, i.e., data is additionally written in the buffer. On the other hand, no new data can be directly written in the position of any invalid data because the positions of valid data to be removed from the random write buffer 32 by rearrangement are scattered at addresses here and there in the random write buffer 32. Accordingly, garbage collection must be performed at a certain timing. Note that garbage collection is the process of releasing unnecessary invalid data and making the data area usable again (i.e., enabling the data area to write data in it by additional write).

In this embodiment, garbage collection is performed to satisfy, e.g., conditions (1) to (4) below.

(1) Garbage collection of four pages is performed whenever data is written in the random write buffer 32. Since this makes it possible to shorten the process time of garbage collection performed during the busy period of one single-block write operation, timeout can be prevented.

(2) Data write to the random write buffer 32 is preferentially performed from a block having the smallest free space.

(3) An object of garbage collection is a block in which the number of invalid data (the number of garbage) is ¼ or more of one block, and the amount of garbage is largest.

(4) Letting L be the number of minimum necessary blocks calculated from the number of entries required for the random write buffer 32, the number of blocks in the random write buffer 32 is set to "(4/3)L+1".

The number of blocks in the random write buffer 32 is set to satisfy these conditions. Consequently, when the random write buffer 32 is filled with (4/3)L blocks, at least one block in which the amount of garbage is ¼ or more always exists. To perform garbage collection in this block, write of new data of a ¼ block is necessary. As a consequence, a free space of a ¼ block is formed. Therefore, no garbage overflows from the random write buffer 32.

Figure 7:
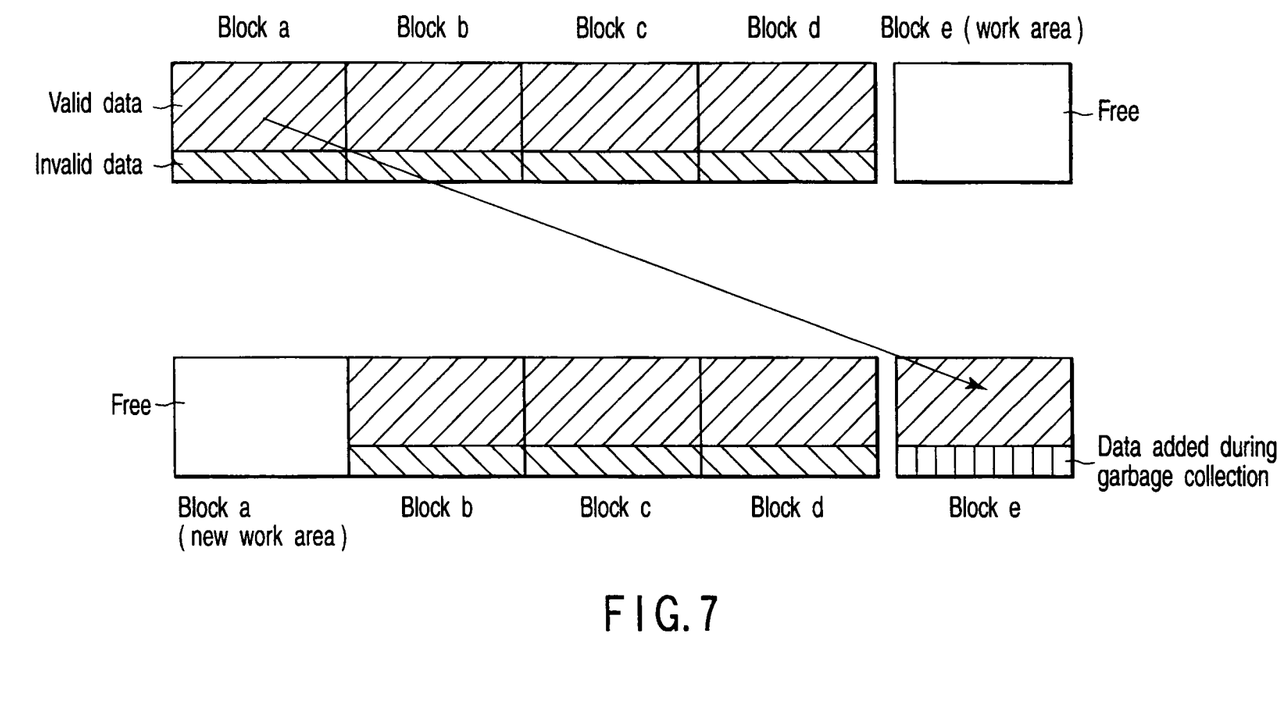
FIG. 7 is a schematic view illustrating a garbage collecting operation of the random write buffer 32.

FIG. 7 is a schematic view illustrating the garbage collecting operation of the random write buffer 32. Assuming that the number of minimum necessary blocks calculated from the number of entries required for the random write buffer 32 is three, the number of blocks in the random write buffer 32 that satisfies condition (4) described above is five. FIG. 7 shows the way this happens. That is, the random write buffer 32 is composed of five blocks a to e. Block e of these five blocks is used as a work area. Hence, block e is a free space from which data is erased.

Valid data and invalid data (garbage) are stored in each of blocks a to d. Note that FIG. 7 is a view illustrating the data amounts in each block, so the order of data in each block is different from the actual order.

As shown in FIG. 7, when blocks a to d are filled with data, at least one block in which garbage is equal to or larger than a ¼ block exists. This block is an object of garbage collection. If block a is regarded as an object of garbage collection, for example, valid data in block a is moved to block e as a work area.

Also, this garbage collection is performed for every four pages as described previously, additional data newly written in the random write buffer 32 during garbage collection is also written in block e as a work area. Invalid data in the random write buffer 32 can be rearranged by thus performing the garbage collecting operation.

A practical garbage collecting operation will be explained below. Assume that the number of logical blocks in the storage area 31 is 20. Assume also that each block in the random write buffer 32 has eight pages (eight entries). Therefore, the number of minimum necessary blocks in the random write buffer 32 is (20+4)/8=3. Furthermore, the number of blocks in the random write buffer 32 is (4/3)·3+1=5. Assume that these five blocks are blocks a to e.

Figure 8:
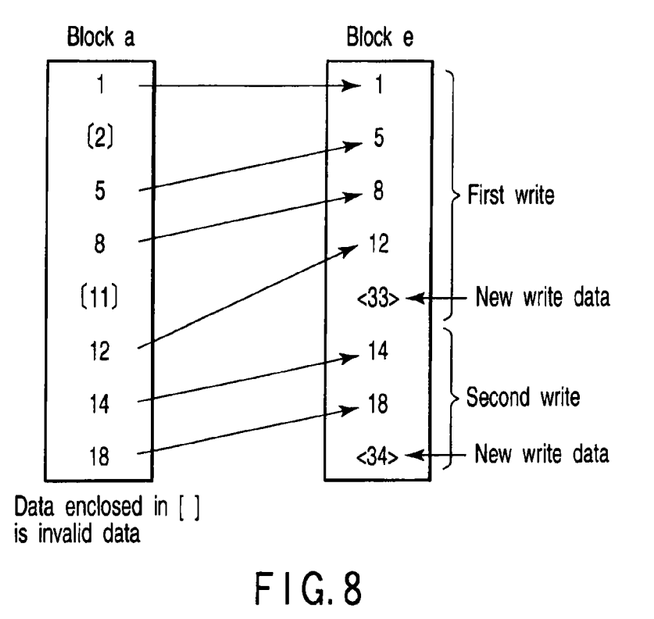
FIG. 8 is a schematic view illustrating a practical garbage collecting operation.
Figure 9:
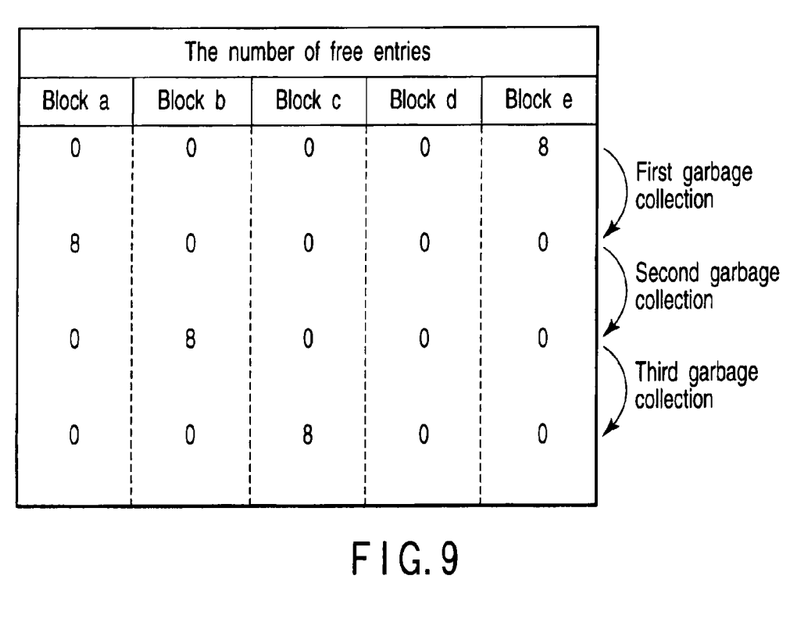
FIG. 9 is a view illustrating the number of free entries of blocks included in the random write buffer 32.

FIG. 8 is a schematic view illustrating the practical garbage collecting operation. FIG. 9 is a view illustrating the number of free entries of the blocks included in the random write buffer 32.

When blocks a to d are filled with data, the random write buffer 32 has 32 data entries. Since the number of valid data in the random write buffer 32 is 24 or less, eight or more data are invalid data. Accordingly, blocks containing at least two invalid data exist. One of these blocks is an object of garbage collection. Assume that block a is an object of garbage collection, and rearranged into block e.

Referring to FIG. 8, data 1, 2, 5, 8, 11, 12, 14, and 18 are written in block a, and data 2 and 11 are invalid data. In the first single-block write operation (write of data 33), data 1, 5, 8, and 12 of four pages are moved to block e, and new write data 33 is written in block e.

Subsequently, in the second single-block write operation (write of data 34), data 14 and 18 of the remaining pages are moved to block e, and new write data 34 is written in block e. In this manner, garbage collection of block a can be performed by the two write operations. After that, the data in block a is erased to make it usable as a next work block.

As shown in FIG. 9, when garbage collection is performed in block a, the number of free entries in block a is eight. Likewise, a maximum number of valid data in blocks b to e is 24, so at least eight data are invalid data. Accordingly, at least one block containing two or more invalid data exists. If this block is block b, block b is rearranged into block a.

Also, a maximum number of valid data in blocks a, c, d, and e is 24, so at least eight data are invalid data. Therefore, at least one block containing two or more invalid data exists. If this block is block c, block c is rearranged into block b. When the blocks are sequentially rearranged as described above, no garbage overflows from the random write buffer 32.

[3-2] Control of Multi-Block Write

Next, a multi-block write operation will be explained. The memory card 20 of this embodiment can also write a plurality of consecutive data blocks transmitted following a multi-block write command from the host apparatus 10. Multi-block write is data write when these data blocks are consecutive logical addresses.

Figure 10:
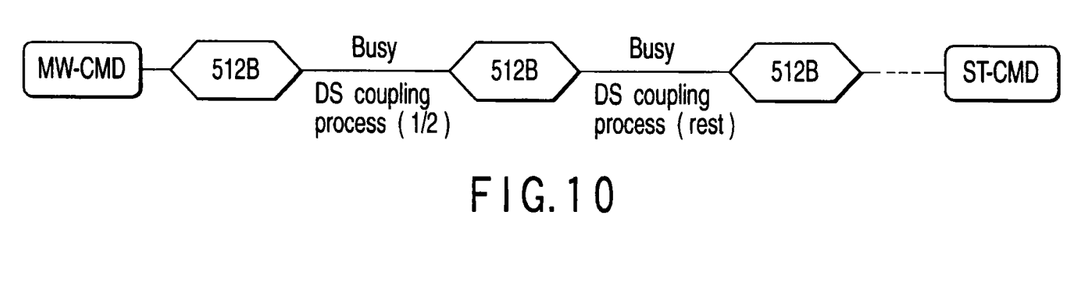
FIG. 10 is a timing chart illustrating a multi-block write operation.

FIG. 10 is a timing chart illustrating the multi-block write operation. Note that FIG. 10 shows data on the bus connecting the host apparatus 10 and controller 21.

First, the controller 21 receives a multi-block write command (MW-CMD) issued from the host apparatus 10, and interprets the command. Subsequently, the host apparatus 10 transmits a 512-B data block (write data) to the controller 21.

The controller 21 transmits a busy signal to the host apparatus 10. The controller 21 then executes the process of receiving the data block transmitted from the host apparatus 10 (more specifically, the process of temporarily writing the data block in the RAM buffer 29), within the range of a maximum busy time. When this receiving process is complete, the controller 21 cancels the busy state. After that, the controller 21 writes this data block in the storage area 31 of the NAND flash memory 22. If the DS coupling process is necessary, the controller 21 performs a half of the DS coupling process during the busy period corresponding to this data block, in parallel with the data block receiving process.

Subsequently, the host apparatus 10 transmits the next data block to the controller 21. The controller 21 transmits a busy signal to the host apparatus 10. The controller 21 then executes the process of receiving the data block transmitted from the host apparatus 10 within the range of a maximum busy time. When this receiving process is complete, the controller 21 cancels the busy state. After that, the controller 21 writes this data block in the storage area 31 of the NAND flash memory 22. Also, the controller 21 performs the remaining half of the DS coupling process during the busy period corresponding to this data block, in parallel with the data block receiving process.

Similarly, the controller 21 receives a plurality of data blocks transmitted from the host apparatus 10, and performs a half of the DS coupling process during the busy period corresponding to each of these data blocks.

When the transmission of the data blocks is complete, the host apparatus 10 issues a stop command (ST-CMD). The controller 21 receives this stop command (ST-CMD), and interprets the command. Thus, the controller 21 detects that data transfer corresponding to the multi-block write command (MW-CMD) is complete.

Figure 11:
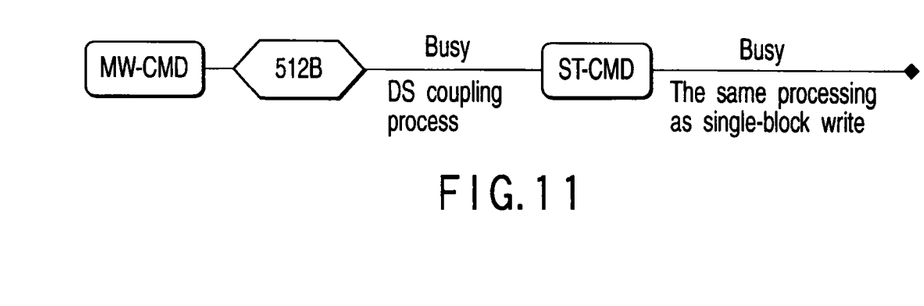
FIG. 11 is a timing chart illustrating another example of the multi-block write operation.

Note that only one data block is sometimes transferred following a multi-block write command (MW-CMD). FIG. 11 is a timing chart illustrating another example of the multi-block write operation.

The controller 21 receives a multi-block write command (MW-CMD) issued from the host apparatus 10, and interprets the command. Subsequently, the host apparatus 10 transmits a data block to the controller 21. The controller 21 executes the process of receiving the data block transmitted from the host apparatus 10 within the range of a maximum busy time. If the DS coupling process is necessary, the controller 21 performs a half of the DS coupling process during the busy period corresponding to this data block, in parallel with the data block receiving process.

If a stop command (ST-CMD) is transmitted from the host apparatus 10 after the data block, the controller 21 executes the same processing as that of single-block write after that. That is, the controller 21 adds the data block to the random write buffer 32. This processing can reduce the data moving process even when only one data block is transmitted following a multi-block write command.

This embodiment reduces the data copying amount to a maximum of a ½ block when a multi-block write operation is performed twice for the same block. That is, one block is managed as it is divided into two areas. If data rewrite occurs in these two areas, new data to be written is sequentially written from the first page of a corresponding area in an erased physical block regardless of the logical addresses (to be referred to as a dual-page shift method hereinafter).

Figure 12:
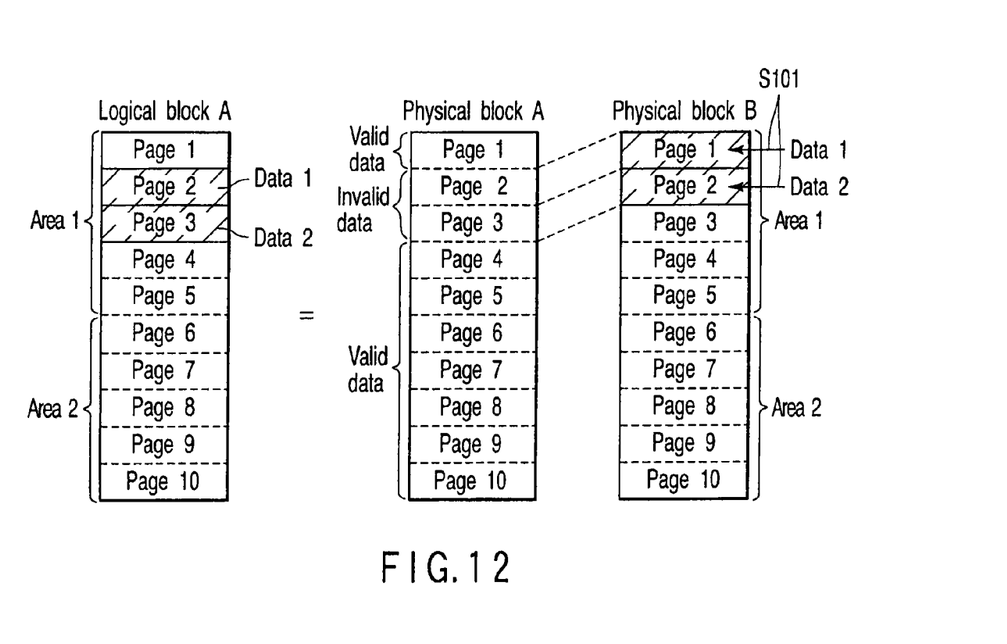
FIG. 12 is a schematic view illustrating a data rewrite operation in a dual-page shift method.
Figure 13:
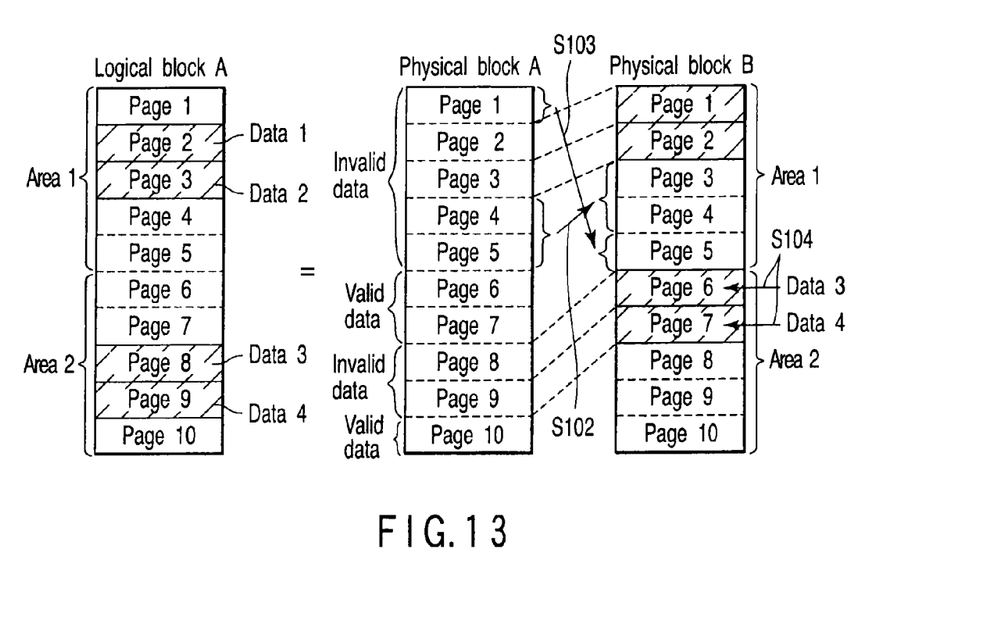
FIG. 13 is a schematic view that follows FIG. 12 and explains the data rewrite operation in the dual-page shift method.

FIGS. 12 and 13 are schematic views illustrating a data rewrite operation in the dual-page shift method. For the sake of simplicity, FIGS. 12 and 13 illustrate an example in which one block is composed of 10 pages. Each physical block is managed as it is divided into area 1 including pages 1 to 5, and area 2 including pages 6 to 10. Arbitrary data is prewritten in pages 1 to 10 of logical block A. The same data as that of, e.g., logical block A is written in pages 1 to 10 of physical block A. Also, physical block B is an erased physical block.

As shown in FIG. 12, the host apparatus 10 successively writes data block 1 (data 1) and data block 2 (data 2) in pages 2 and 3 of area 1 in logical block A of the memory card 20. The controller 21 does not write data 1 and 2 in pages corresponding to the logical addresses in erased physical block B, but sequentially writes data 1 and 2 from the first page (page 1) of area 1 in physical block B (step S101). At the same time, the controller 21 writes the addresses of the pages (pages 2 and 3 of physical block A) as objects of the write request in redundancy areas of the pages in which the new data are written.

Subsequently, as shown in FIG. 13, the host apparatus 10 successively writes data block 3 (data 3) and data block 4 (data 4) in pages 8 and 9 of area 2 in logical block A of the memory card 20. The controller 21 executes the process of moving the data written in area 1 of physical block A. That is, the controller 21 writes the data of pages 4 and 5 of physical block A in pages 3 and 4, respectively, of physical block B (step S102). The controller 21 then writes the data of page 1 of physical block A in page 5 of physical block B (step S103).

The controller 21 does not write data 3 and 4 in pages corresponding to the logical addresses in physical block B, but sequentially writes data 3 and 4 from the first page (page 6) of area 2 in physical block B (step S104). At the same time, the controller 21 writes the addresses of the pages (pages 8 and 9 of physical block A) as objects of the write request in redundancy areas of the pages in which the new data are written.

The processing as described above obviates the data moving process when overwriting data in area 1 of logical block A. This makes it possible to perform a rewrite operation to area 1 at a high speed. In addition, a maximum data copying amount can be reduced to a ½ block when overwriting data in area 2 of logical block A. This makes it possible to shorten the time required for the moving process. As a consequence, timeout can be prevented.

[4] Series of Data Write Operations

Operations from the reception of a write command (single-block write command or multi-block write command) to the end of a series of write processes pertaining to this write command will be explained below.

Figure 14:
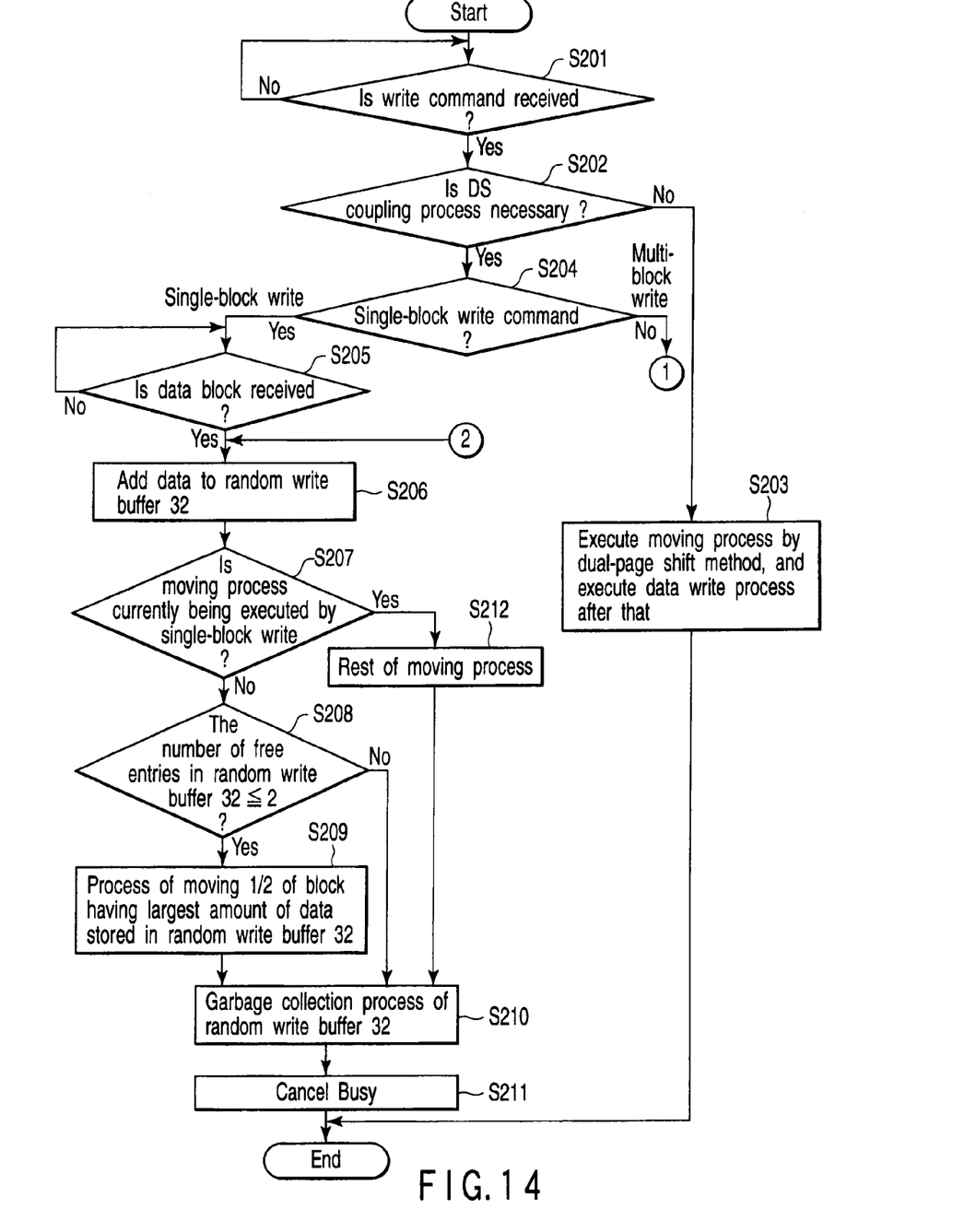
FIG. 14 is a flowchart illustrating a series of operations concerning a write command.
Figure 15:
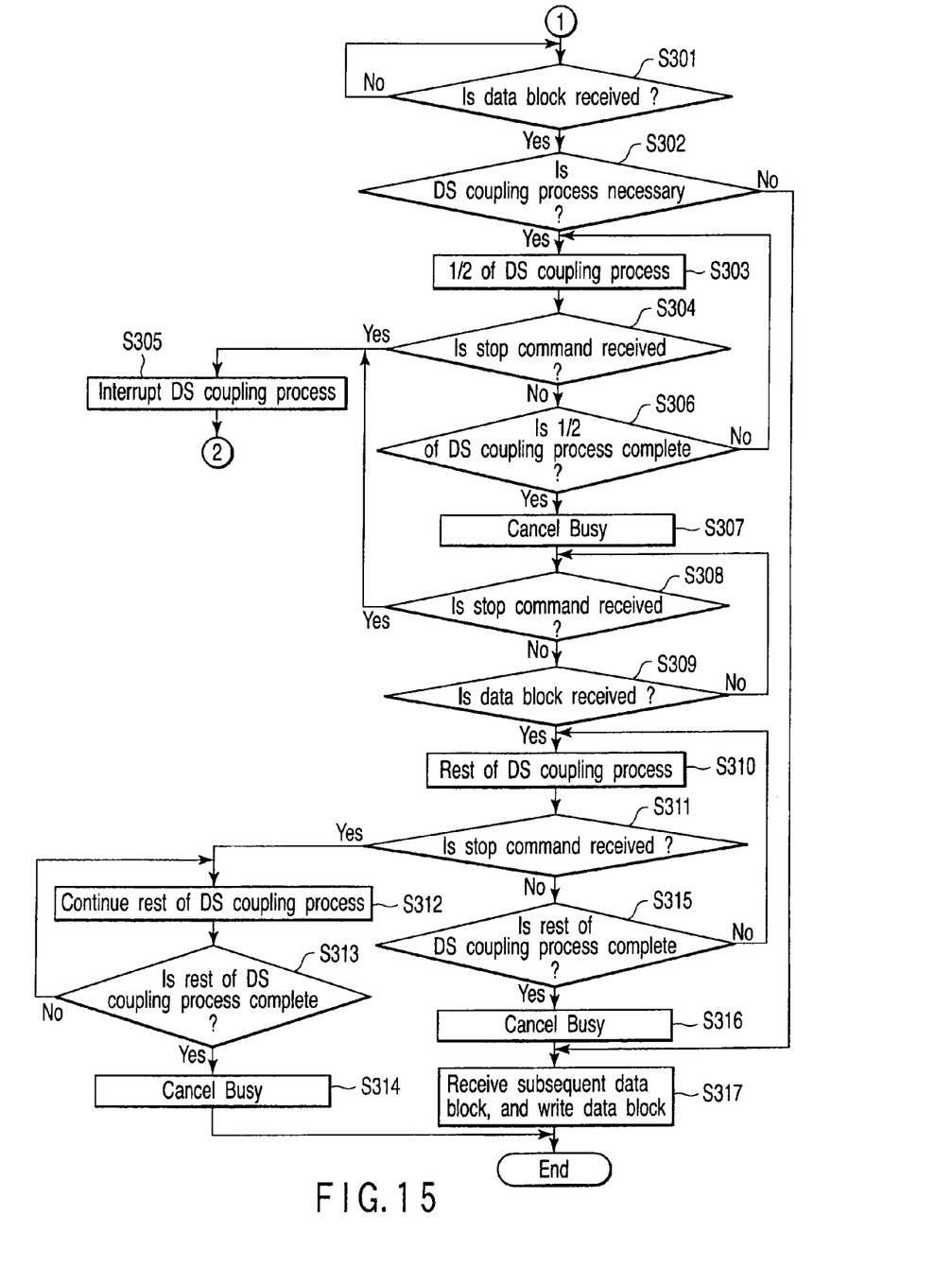
FIG. 15 is a flowchart that follows FIG. 14 and shows a series of operations concerning a write command.

FIGS. 14 and 15 are flowcharts illustrating a series of operations pertaining to a write command. When receiving a write command from the host apparatus 10 (step S201), the controller 21 checks whether the DS coupling process is necessary (step S202). If no DS coupling process is necessary, the controller 21 executes a moving process by using the dual-page shift method, and executes a data write process (including a data receiving process) after that (step S203).

If the DS coupling process is necessary in step S202, the controller 21 interprets the write command received from the host apparatus 10 (step S204). If this write command is a single-block write command, the controller 21 executes the single-block write operation after that.

That is, when receiving a data block from the host apparatus 10 (step S205), the controller 21 adds this data block to the random write buffer 32 (step S206). Subsequently, the controller 21 checks whether the block is currently being moved by the single-block write operation (i.e., the moving process of a half of the block is complete) (step S207).

If no moving process is currently being performed, the controller 21 checks whether the number of free entries in the random write buffer 32 is two or less (step S208). If the number of free entries is two or less, the controller 21 executes a half of the moving process of a block having the largest data amount stored in the random write buffer 32 (step S209).

Then, the controller 21 executes the garbage collection process of the random write buffer 32 (step S210). After that, the controller 21 cancels the busy state (step S211).

If the moving process is currently being performed in step S207, the controller 21 executes the rest of the moving process (step S212). The controller 21 then advances to step S210, and executes the garbage collection process of the random write buffer 32.

If the number of free entries is larger than two in step S208, the controller 21 advances to step S210, and executes the garbage collection process of the random write buffer 32.

On the other hand, if the write command is not a single-block write command in step S204, the controller 21 executes the multi-block write operation after that. That is, when receiving a data block from the host apparatus 10 (step S310), the controller 21 checks whether the DS coupling process is necessary (step S302). If no DS coupling process is necessary, the controller 21 advances to step S317, and receives the subsequent data block. Then, the controller 21 executes the process of writing data in the storage area 31.

If the DS coupling process is necessary in step S302, the controller 21 executes a half of the DS coupling process (step S303). Subsequently, the controller 21 monitors whether a stop command (ST-CMD) is received (step S304). If the stop command (ST-CMD) is received, the controller 21 interrupts the DS coupling process (step S305). The controller 21 then advances to step S206, and executes the same processing as that of single-block write after that.

If no stop command (ST-CMD) is received in step S304, the controller 21 continues the half of the DS coupling process. If this DS coupling process is complete (step S306), the controller 21 cancels the busy state (step S307).

Subsequently, the controller 21 monitors whether a stop command (ST-CMD) is received (step S308). If the stop command (ST-CMD) is received, the controller 21 interrupts the DS coupling process (step S305), and executes the same processing as that of single-block write after that.

If no stop command (ST-CMD) is received in step S308 and a data block is received (step S309), the controller 21 executes the rest of the DS coupling process (step S310). Subsequently, the controller 21 monitors whether a stop command (ST-CMD) is received (step S311). If the stop command (ST-CMD) is received, the controller 21 continues the rest of the DS coupling process (step S312). If the rest of the DS coupling process is complete (step S313), the controller 21 cancels the busy state (step S314).

If no stop command (ST-CMD) is received in step S311, the controller 21 continues the rest of the DS coupling process. If this DS coupling process is complete (step S315), the controller 21 cancels the busy state (step S316). The controller 21 then receives the subsequent data block, and executes the processing of writing data in the storage area 31 (step S317). In this way, the controller 21 performs a series of processes after receiving the write command.

As described in detail above, this embodiment can satisfy the timeout specification and speed class specification of the memory card standards for both single-block write and multi-block write.

Also, when the DS coupling process is necessary in single-block write, a data block is not written in the storage area 31 but written in the random write buffer 32. This makes it possible to reduce the data moving process. In addition, the capacity of the random write buffer 32 can be reduced by sequentially rearranging invalid data in the random write buffer 32.

In multi-block write, the DS coupling process is divisionally performed during the busy periods. Accordingly, the process of receiving each data block can be performed while the timeout specification is satisfied. Furthermore, the data moving amount can be reduced by using the dual-page shift method. As a consequence, the time required for data moving can be reduced.

In the embodiment described above, the data copy between memory blocks is divisionally performed twice, for the sake of simplicity. Needless to say, the data copying operation may be executed as three or more processes. In this case, the number of memory block divisions used for "data copy" and "page shift" is determined to be three or more. By virtue of this, the embodiment can be applied even to flash memories, which require severe timeout conditions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory device comprising:
   a nonvolatile memory including a plurality of memory blocks each having a plurality of nonvolatile memory cells, data in the nonvolatile memory being erased by each block; and
   a controller configured to manage a memory block by dividing the memory block into two or more areas which include first and second areas, the first area corresponding to a first logical address group, the second area corresponding to a second logical address group, and each of the first and second areas including a plurality of pages, wherein the controller is configured to receive a first write request related to a first logical address of a first memory block and to write data to a first page of a first area of a second memory block regardless of the first logical address when data of the first memory block is rewritten by the first write request, the first logical address belonging to the first logical address group and the first page of the first area being the beginning page of the first area, the controller is configured to receive a second write request related to a second logical address of the first memory block and to write data to a first page of a second area of the second memory block regardless of the second logical address when data of the first memory block is rewritten by the second write request, the second logical address belonging to the second logical address group and the first page of the second area being the beginning page of the second area, and the controller is configured to copy data, stored in a first area of the first memory block and not rewritten by the first write request, from the first area of the first memory block to a second page of the first area of the second memory block before the data is written to the second area of the second memory block by the second write request.

2. The device according to claim 1, wherein the controller is configured to divisionally copy, to the second memory block, data except for data to be rewritten among data pre-stored in the first memory block.

3. The device according to claim 2, wherein the controller is configured to perform the copying process for each area of a memory block.

4. The device according to claim 1, wherein
each of the plurality of pages is a data write unit.

5. The device according to claim 1, wherein the nonvolatile memory is a NAND flash memory.

6. The device according to claim 1, wherein the controller is configured to copy data, stored in a second area of the first memory block not rewritten by the second write request, from the second area of the first memory block to the second area of the second memory block.

7. The device according to claim 1, wherein a physical address of the second area is continuous with a physical address of the first area.

8. The device according to claim 1, wherein a region written by the copying process of the first area is located between a region written by the first write request and a region written by the second write request.

* * * * *